United States Patent
Lee

(10) Patent No.: US 8,514,465 B2
(45) Date of Patent: Aug. 20, 2013

(54) SCANNING APPARATUS HAVING MACHANISM FOR ADJUSTING OPENING OF SHEET PASSAGEWAY

(75) Inventor: Chunyu Lee, Hsinchu (TW)

(73) Assignee: Avision Inc. (TW)

( * ) Notice: Subject to any disclaimer, the term of this patent is extended or adjusted under 35 U.S.C. 154(b) by 322 days.

(21) Appl. No.: 13/006,729

(22) Filed: Jan. 14, 2011

(65) Prior Publication Data

US 2011/0188099 A1    Aug. 4, 2011

(30) Foreign Application Priority Data

Jan. 29, 2010   (TW) ................................ 99102515 A

(51) Int. Cl.
*H04N 1/04* (2006.01)

(52) U.S. Cl.
USPC ............ 358/474; 358/496; 358/497; 358/498

(58) Field of Classification Search
USPC .................. 358/474, 496, 497, 498
See application file for complete search history.

(56) References Cited

U.S. PATENT DOCUMENTS 7,916,357 B2 *   3/2011   Sugiyama et al. ............ 358/474

* cited by examiner

*Primary Examiner* — Houshang Safaipour

(57) ABSTRACT

A scanning apparatus having a mechanism for adjusting an opening of a sheet passageway includes a first assembly, a second assembly and a driving mechanism. The first assembly is moveably disposed. The second assembly is disposed opposite the first assembly. The driving mechanism drives the first assembly to move in a vertical direction to adjust a distance between the first assembly and the second assembly. The driving mechanism includes a horizontally extending portion and a vertically extending portion. The horizontally extending portion is moveable in a horizontal direction. The vertically extending portion, connected to the horizontally extending portion, pushes against the first assembly. The vertically extending portion drives the first assembly to move in the vertical direction in response to the movement of the horizontally extending portion in the horizontal direction.

11 Claims, 5 Drawing Sheets

SCANNING APPARATUS HAVING MACHANISM FOR ADJUSTING OPENING OF SHEET PASSAGEWAY

This application claims priority of No. 099102515 filed in Taiwan R.O.C. on Jan. 29, 2010 under 35 USC 119, the entire content of which is hereby incorporated by reference.

BACKGROUND OF THE INVENTION

1. Field of the Invention

The present invention relates to a scanning apparatus having a mechanism for adjusting an opening of a sheet passageway, and more particularly to a scanning apparatus for which the user can expand the opening of the sheet passageway to clean the interior or from which the user can remove the jammed paper.

2. Related Art

Dust is usually accumulated in a conventional sheet-fed photo scanner after a period of time. Particularly in the compact sheet-fed scanner, it is quite difficult to clean the interior glass, in view of limited space. To prevent the dust particles from affecting the scan quality, the dust particles are subjected to removal by a dedicated cleaning tool. A cleaning brush can be used, where the front end of this dedicated cleaning tool is shaped to fit the space provided by the sheet passageway and made of an artificial leather material. Or, a wetted, dedicated cleaning cloth may be used in coordination with the running of the feeding rollers.

The disadvantage of these dedicated cleaning tools resides in their lack of versatility and applicability for use with various scanner designs. In addition, because the reciprocating movement of the cleaning brush tends to be restricted and hindered by the transporting rollers, the problems of incomplete cleaning and breakage of the cleaning brush might arise. On the other hand, the cleaning cloth can only be used once or a limited number of times.

SUMMARY OF THE INVENTION

Accordingly, the present invention has been proposed to solve the problems of the prior art, and it is an object of the present invention to provide a scanning apparatus for which the user can expand the opening of the sheet passageway to clean the interior or from which the user can remove the jammed paper.

To achieve the above-identified object, the present invention provides a scanning apparatus with an adjustable opening of a sheet passageway. The scanning apparatus includes a first assembly, a second assembly and a driving mechanism. The first assembly is moveably disposed. The second assembly is disposed opposite the first assembly. The driving mechanism drives the first assembly to move in a vertical direction to adjust a distance between the first assembly and the second assembly. The driving mechanism includes a horizontally extending portion moveable in a horizontal direction, and a vertically extending portion, connected to the horizontally extending portion, for pushing against the first assembly. The vertically extending portion drives the first assembly to move in the vertical direction in response to movement of the horizontally extending portion in the horizontal direction.

In the present invention, the opening of the sheet passageway can be expanded for the user to remove the jammed paper or clean the interior of the scanning apparatus conveniently.

Further scope of the applicability of the present invention will become apparent from the detailed description given hereinafter. However, it should be understood that the detailed description and specific examples, while indicating preferred embodiments of the present invention, are given by way of illustration only, since various changes and modifications within the spirit and scope of the present invention will become apparent to those skilled in the art from this detailed description.

DETAILED DESCRIPTION OF THE INVENTION

Figure 1:
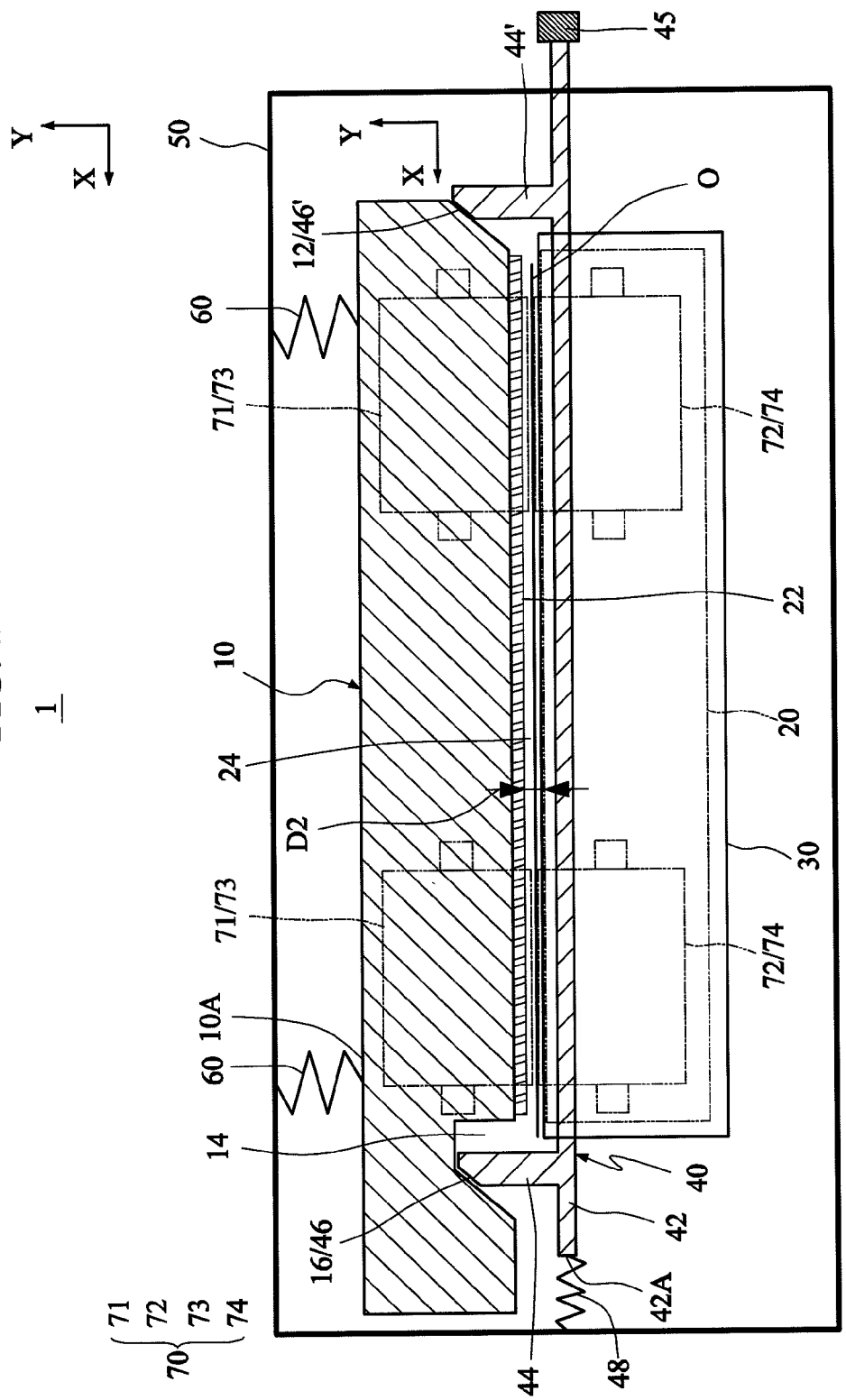
FIGS. 1 and 2 are front views showing first and second states of a scanning apparatus according to a preferred embodiment of the present invention.
Figure 2:
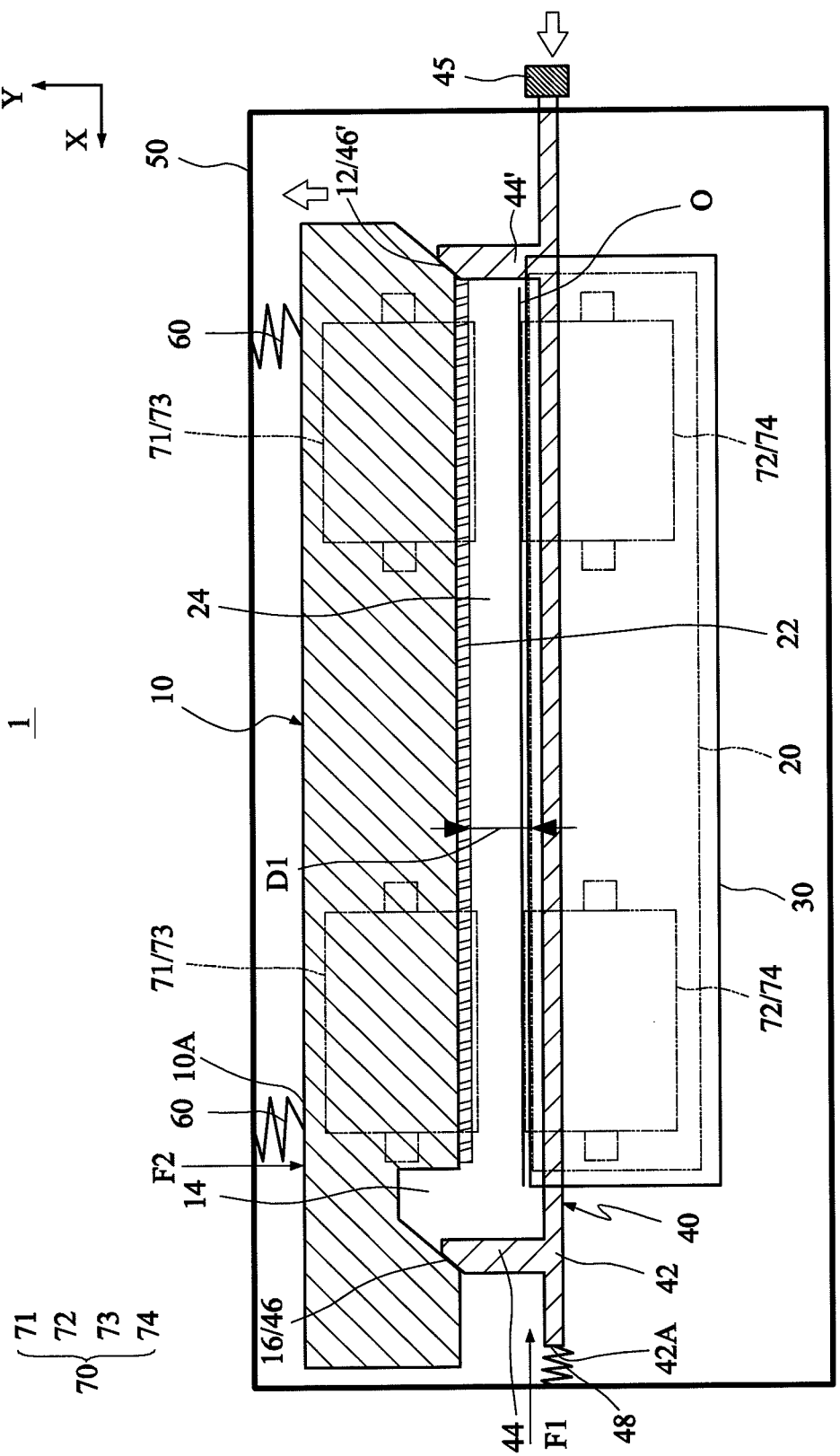
Figure 3:
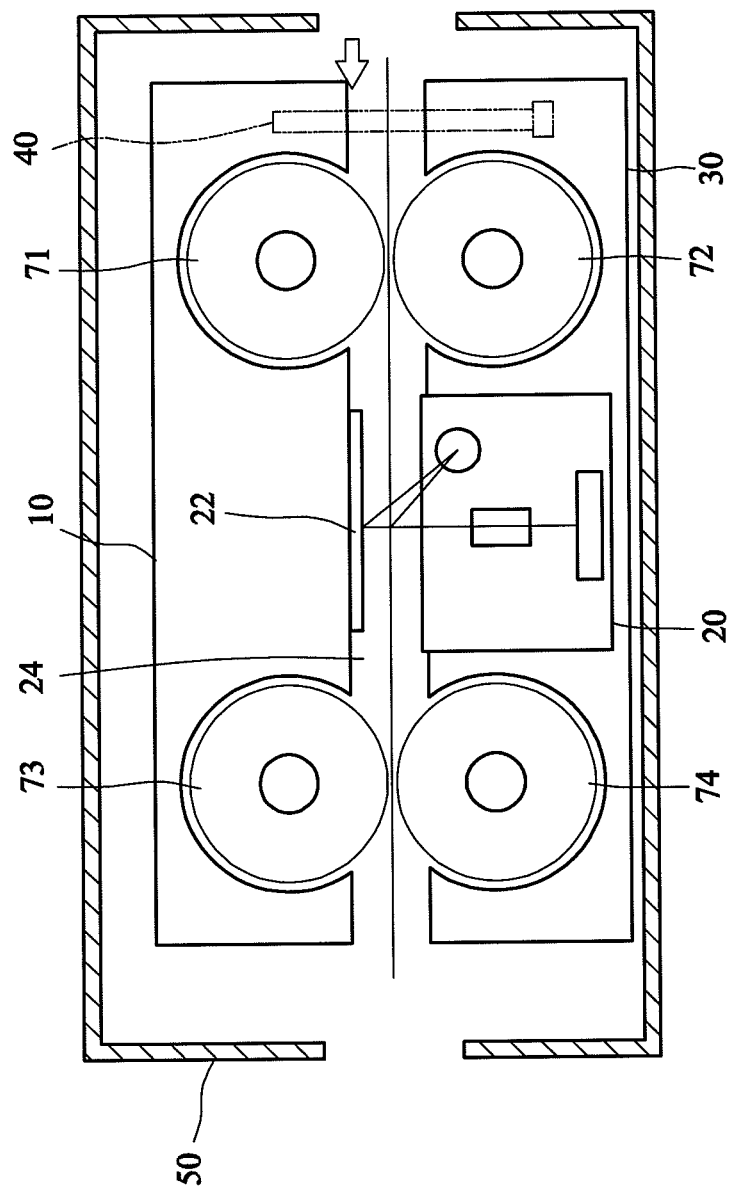
FIGS. 3 and 4 are side views showing the first and second states of the scanning apparatus according to the preferred embodiment of the present invention.
Figure 4:
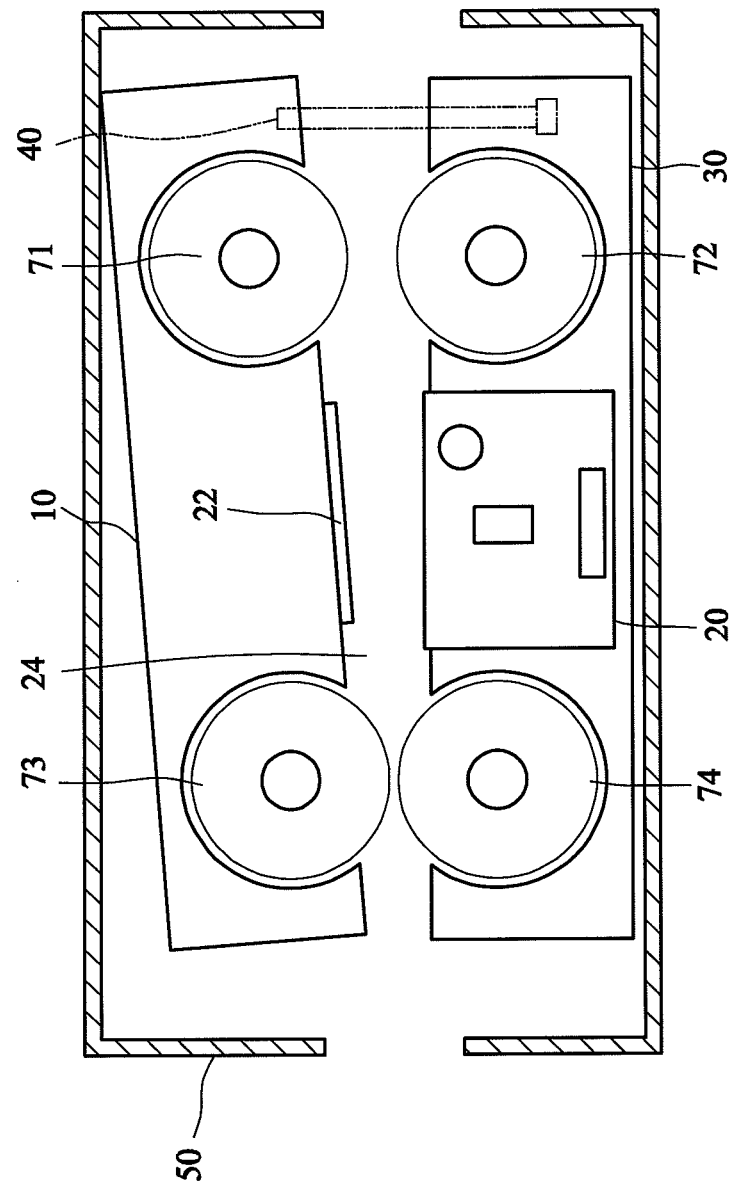

FIGS. 1 and 2 are front views showing first and second states of a scanning apparatus 1 according to a preferred embodiment of the present invention. FIGS. 3 and 4 are side views showing the first and second states of the scanning apparatus 1 according to the preferred embodiment of the present invention. It is to be noted that in the first state the scanning apparatus 1 is normally used, while in the second state the function of adjusting an opening of a sheet passageway of the scanning apparatus 1 of the present invention is enabled. The opening of the sheet passageway in the second state is larger than that in the first state.

Referring to FIGS. 1 to 4, the scanning apparatus 1 of this embodiment includes a first assembly 10, a second assembly 30 and a driving mechanism 40. A sheet passageway 24, through which an original is transported, is provided between the first assembly 10 and the second assembly 30. In addition, the scanning apparatus 1 further includes a scan module 20 and a housing 50. The scan module 20, in this embodiment is disposed in the second assembly 30. The scan module 20 may be disposed in the first assembly 10, alternatively. The first assembly 10, the second assembly 30 and the driving mechanism 40 are disposed in the housing 50. The first assembly 10 is moveably disposed in the housing 50. The second assembly 30 is disposed opposite the first assembly 10. The driving mechanism 40 drives the first assembly 10 to move in a vertical direction Y and adjusts the distance between the first assembly 10 and the second assembly 30. For example, the distance is increased from D2 in FIG. 1 to D1 in FIG. 2. The driving mechanism 40 includes a horizontally extending portion 42 and a vertically extending portion 44. The vertically extending portion 44, connected to the horizontally extending portion 42, is substantially perpendicular to the horizontally extending portion 42. In this embodiment, the driving mechanism 40 is supported by the second assembly 30.

The horizontally extending portion 42 is moveable in a horizontal direction X. The vertically extending portion 44, connected to the horizontally extending portion 42, pushes against the first assembly 10. The vertically extending portion 44 drives the first assembly 10 to move in the vertical direction Y in response to the movement of the horizontally extending portion 42 in the horizontal direction X, such that the distance between the first assembly 10 and the second assembly 30 is expanded.

A calibration member, such as a calibration sheet 22, is disposed on a lower surface of the first assembly 10 facing the second assembly 30. The calibration sheet 22 is used as reference for calibration of the image sensors. The scan module 20 scans the original O transported, by a transporting mechanism 70, through the sheet passageway 24, and is calibrated according to the calibration results. The transporting mechanism 70 includes rollers 71, 72, 73 and 74. The calibration sheet 22 is disposed between the rollers 71 and 73, and facing the scan module 20.

The driving mechanism 40 may further include an actuation part 45 connected to the horizontally extending portion 42. In this embodiment, the actuation part 45 is formed to project from the housing 50. The actuation part 45 is operated to enable the driving mechanism 40. For example, the actuation part 45 may be a pressing part to be pressed by the user to move the horizontally extending portion 42 in the horizontal direction X or trigger the movement of the horizontally extending portion 42.

In addition, the driving mechanism 40 may further include a spring 48, connected to the housing 50 and a horizontally extending end 42A of the horizontally extending portion 42, for providing a first restoring force F1 to the horizontally extending portion 42 in the horizontal direction X to restore the horizontally extending portion 42 to the original position after the user releases the actuation part 45. To restore the first assembly 10 to its original position, the scanning apparatus 1 may further include a spring 60, connected to the housing 50 and a vertically extending end 10A of the first assembly 10, for providing a second restoring force F2 to the first assembly 10 in the vertical direction Y.

In addition, the driving mechanism 40 may further include a second vertically extending portion 44' connected to the horizontally extending portion 42 for pushing against the first assembly 10. The second vertically extending portion 44' drives the first assembly 10 to move in the vertical direction Y in response to the movement of the horizontally extending portion 42 in the horizontal direction X.

In this embodiment, the vertically extending portion 44 has a first inclined plane 46 for pushing against a surface of the first assembly 10. The first inclined plane 46 slides relatively to the surface of the first assembly 10 to move the first assembly 10 in the vertical direction Y in response to the movement of the horizontally extending portion 42 in the horizontal direction X.

The surface of the first assembly 10 includes a second inclined plane 16, which matches the first inclined plane 46 and is formed in a recess 14 of the first assembly 10.

Similarly, the second vertically extending portion 44' may also have a first inclined plane 46' matching and pushing against a second inclined plane 12 of the first assembly 10. The first inclined plane 46' slides relatively to the second inclined plane 12 of the first assembly 10 in response to the movement of the horizontally extending portion 42 in the horizontal direction X to move the first assembly 10 in the vertical direction Y.

Figure 5:
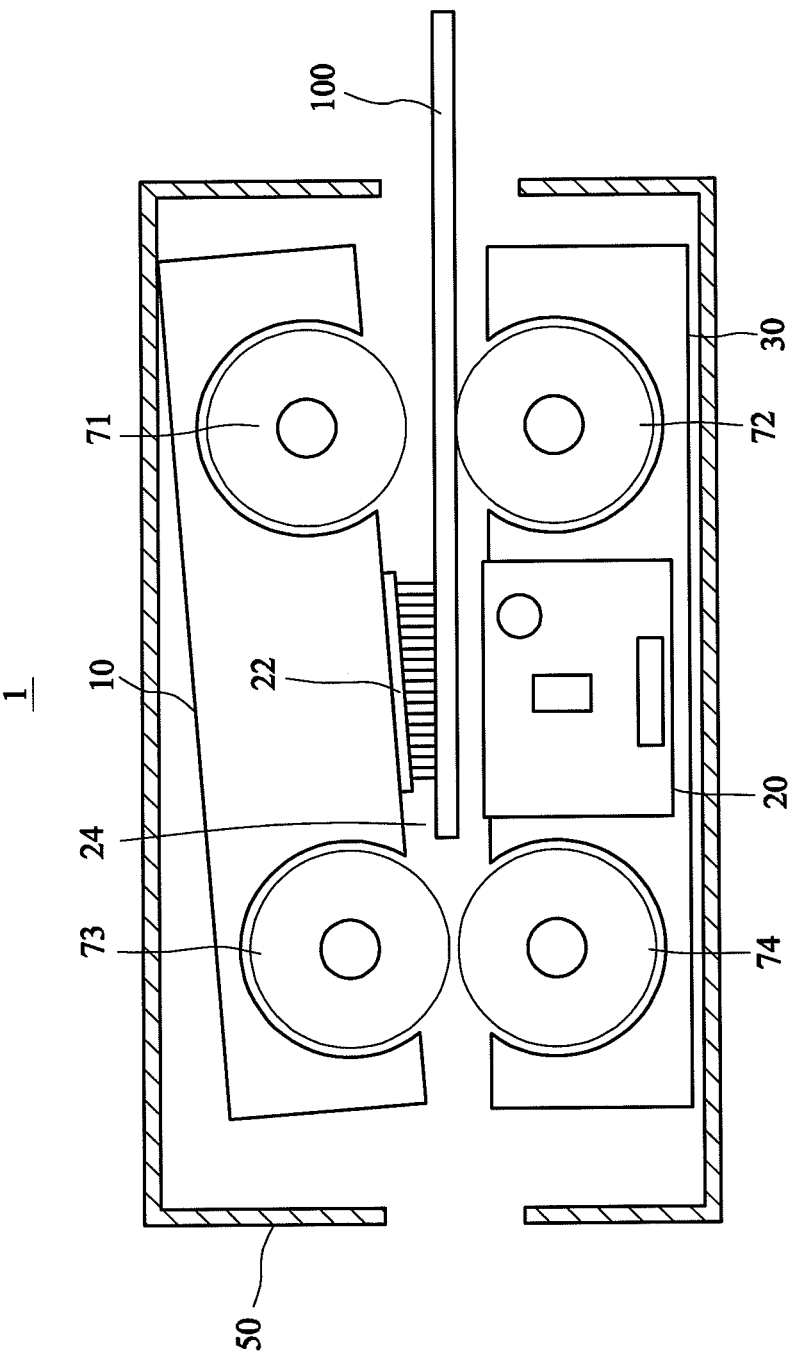
FIG. 5 shows an application of the scanning apparatus used with a cleaning device according to the preferred embodiment of the present invention.

With the above-mentioned structure of the present invention, when paper jam or poor images occur, the user can operate the driving mechanism 40 to expand the opening of the sheet passageway 24, and then remove the jammed paper or clean the interior of the scanning apparatus 1. FIG. 5 shows an example of an application of the scanning apparatus 1 used with a cleaning device according to the preferred embodiment of the present invention. As shown in FIG. 5, when the opening of the sheet passageway 24 is expanded, the user can insert a cleaning member 100 into the sheet passageway 24 to clean the glass or the calibration sheet 22 inside the scanning apparatus 1. It is to be noted that the first assembly 10 may be lifted as a whole or partially lifted up in an inclined manner.

For a sheet-fed scanner without an openable cover, the present invention provides a mechanism facilitating the maintenance of the scanner. The interior of the scanning apparatus 1 can be effectively cleaned using a regular scanner cleaning kit or brush without using a dedicated tool. The cleaning kit will not be damaged because of the collisions with the feeding rollers.

While the present invention has been described by way of examples and in terms of preferred embodiments, it is to be understood that the present invention is not limited thereto. To the contrary, it is intended to cover various modifications. Therefore, the scope of the appended claims should be accorded the broadest interpretation so as to encompass all such modifications.

What is claimed is:

1. A scanning apparatus, comprising:
    a first assembly moveably disposed;
    a second assembly disposed opposite the first assembly; and
    a driving mechanism for driving the first assembly to move in a vertical direction to adjust a distance between the first assembly and the second assembly, the driving mechanism comprising:
        a horizontally extending portion moveable in a horizontal direction; and
        a vertically extending portion, connected to the horizontally extending portion, for pushing against the first assembly, wherein the vertically extending portion drives the first assembly to move in the vertical direction in response to movement of the horizontally extending portion in the horizontal direction.

2. The scanning apparatus according to claim 1, further comprising a scan module disposed in one of the first assembly and the second assembly, wherein a sheet passageway is provided between the first assembly and the second assembly, and the scan module scans an original transported through the sheet passageway.

3. The scanning apparatus according to claim 1, further comprising:
    a housing, in which the first assembly, the second assembly and the driving mechanism are disposed.

4. The scanning apparatus according to claim 3, wherein the driving mechanism further comprises an actuation part connected to the horizontally extending portion, wherein the actuation part, is operated to enable the driving mechanism.

5. The scanning apparatus according to claim 4, wherein the actuation part is projected from the housing, and the actuation part is pressed to trigger the movement of the horizontally extending portion.

6. The scanning apparatus according to claim 3, wherein the driving mechanism further comprises:
    a spring, connected to the housing and a horizontally extending end of the horizontally extending portion, for providing a first restoring force to the horizontally extending portion in the horizontal direction.

7. The scanning apparatus according to claim 3, further comprising:
    a spring, connected to the housing and a vertically extending end of the first assembly, for providing a second restoring force to the first assembly in the vertical direction.

8. The scanning apparatus according to claim 1, wherein the vertically extending portion has a first inclined plane for pushing against a surface of the first assembly, wherein the first inclined plane slides on the surface of the first assembly in response to the movement of the horizontally extending portion in the horizontal direction, such that the first assembly is moved in the vertical direction.

9. The scanning apparatus according to claim 8, wherein the surface of the first assembly comprises a second inclined plane matching the first inclined plane.

10. The scanning apparatus according to claim 1, wherein the driving mechanism further comprises:
a second vertically extending portion, connected to the horizontally extending portion and pushing against the first assembly, wherein the second vertically extending portion drives the first assembly to move in the vertical direction in response to the movement of the horizontally extending portion in the horizontal direction.

11. The scanning apparatus according to claim 1, wherein the driving mechanism is supported by the second assembly.

* * * * *